United States Patent
Arcas-Luque et al.

(10) Patent No.: US 7,110,568 B2
(45) Date of Patent: Sep. 19, 2006

(54) SEGMENTATION OF A POSTAL OBJECT DIGITAL IMAGE BY HOUGH TRANSFORM

(75) Inventors: Gilles Arcas-Luque, Cachan (FR); Olivier Pietri, Clamart (FR)

(73) Assignee: Solystic, Gentilly Cedex (FR)

( * ) Notice: Subject to any disclaimer, the term of this patent is extended or adjusted under 35 U.S.C. 154(b) by 599 days.

(21) Appl. No.: 10/239,684

(22) PCT Filed: Jun. 19, 2001

(86) PCT No.: PCT/FR01/01902

§ 371 (c)(1),
(2), (4) Date: Sep. 25, 2002

(87) PCT Pub. No.: WO02/01489

PCT Pub. Date: Jan. 3, 2002

(65) Prior Publication Data

US 2004/0005081 A1    Jan. 8, 2004

(30) Foreign Application Priority Data

Jun. 27, 2000    (FR) .................................. 00 08246

(51) Int. Cl.
*G06K 9/00* (2006.01)
*G06K 9/20* (2006.01)
*G06K 9/34* (2006.01)
*G06K 9/36* (2006.01)

(52) U.S. Cl. .................. 382/101; 382/176; 382/281; 382/321

(58) Field of Classification Search ............... 382/101, 382/102, 176, 281, 294–296, 321
See application file for complete search history.

(56) References Cited

U.S. PATENT DOCUMENTS

| | | | | |
|---|---|---|---|---|
| 3,069,654 A | * | 12/1962 | Hough | 382/281 |
| 4,558,461 A | * | 12/1985 | Schlang | 382/290 |
| 5,054,098 A | | 10/1991 | Lee | |
| 5,212,739 A | * | 5/1993 | Johnson | 382/177 |
| 5,504,319 A | * | 4/1996 | Li et al. | 235/462.08 |

(Continued)

OTHER PUBLICATIONS

Courtellemont, P.; Olivier, C.; Avila, M., "2-D modeling and Hough Transform for document analysis," Nov. 1992, IEEE, Proceedings of the 1992 International Conference on Industrial Electronics, Control, Instrumentation, and Automation, vol. 3, pp. 1325-1330.*

(Continued)

*Primary Examiner*—Bhavesh M. Mehta
*Assistant Examiner*—Anthony Mackowey
(74) *Attorney, Agent, or Firm*—Sughrue Mion, PLLC

(57) ABSTRACT

In order to segment a digital image of a postal packet in order to read a postal address (AP) automatically on said packet, the method consists: in subdividing (20) the image into image blocks of identical size; in applying (30) processing based on a Hough transform to each image block in order to identify in the image block in question a privileged direction for the distribution of image points in the block under consideration; in grouping together (40) contiguous image blocks within the image having a common privileged direction in order to define (50) a rectangular zone of interest (ZI) containing the group of said contiguous blocks having a common privileged direction in such a manner that said rectangular zone of interest has a longitudinal edge parallel to said common privileged direction; and in applying the automatic address-recognition algorithm to said zone of interest in the image in order to read a postal address automatically.

3 Claims, 4 Drawing Sheets

U.S. PATENT DOCUMENTS

| | | | | |
|---|---|---|---|---|
| 5,517,586 | A * | 5/1996 | Knowlton | 382/292 |
| 5,770,841 | A * | 6/1998 | Moed et al. | 235/375 |
| 5,774,580 | A * | 6/1998 | Saitoh | 382/176 |
| 6,014,450 | A * | 1/2000 | Heilper et al. | 382/101 |
| 6,108,444 | A * | 8/2000 | Syeda-Mahmood | 382/186 |
| 6,377,698 | B1 * | 4/2002 | Cumoli et al. | 382/101 |
| 6,490,376 | B1 * | 12/2002 | Au et al. | 382/290 |
| 6,577,763 | B1 * | 6/2003 | Fujimoto et al. | 382/199 |
| 6,665,422 | B1 * | 12/2003 | Seidel et al. | 382/101 |
| 6,687,421 | B1 * | 2/2004 | Navon | 382/289 |
| 6,738,496 | B1 * | 5/2004 | Van Hall | 382/101 |

OTHER PUBLICATIONS

Fletcher, L.A.; Kasturi, R., "A Robust Algorithm for Text String Separation from Mixed Text/Graphics Images," Nov. 1988, IEEE Transactions on Pattern Analysis and Machine Intelligence, vol. 10, issue 6, pp. 910-918.*

Gatos, B.; Perantonis, S.J.; Papamarkos, N., "Accelerated Hough transform using rectangular image decomposition," Apr. 1996, IEEE, Electronics Letters, vol. 32, issue 8, pp. 730-732.*

Duda, R.; Hart, P., "Use of the Hough Transformation to Detect Lines and Curves in Pictures," 1972, Association for Computing Machinery, Inc., Communications of the ACM, vol. 15, No. 1, pp. 11-15.*

B. Yu et al., "A Robust and Fast Skew Detection Algorithm for Generic Documents", *Pattern Recognition*, vol. 29, No. 10, 1996, pp. 1599-1629.

K. Willard, "An Approach to the Automatic Retrieval of Latent Fingerprints", XP 000614256, Jul. 5, 1975, pp. 45-51.

* cited by examiner

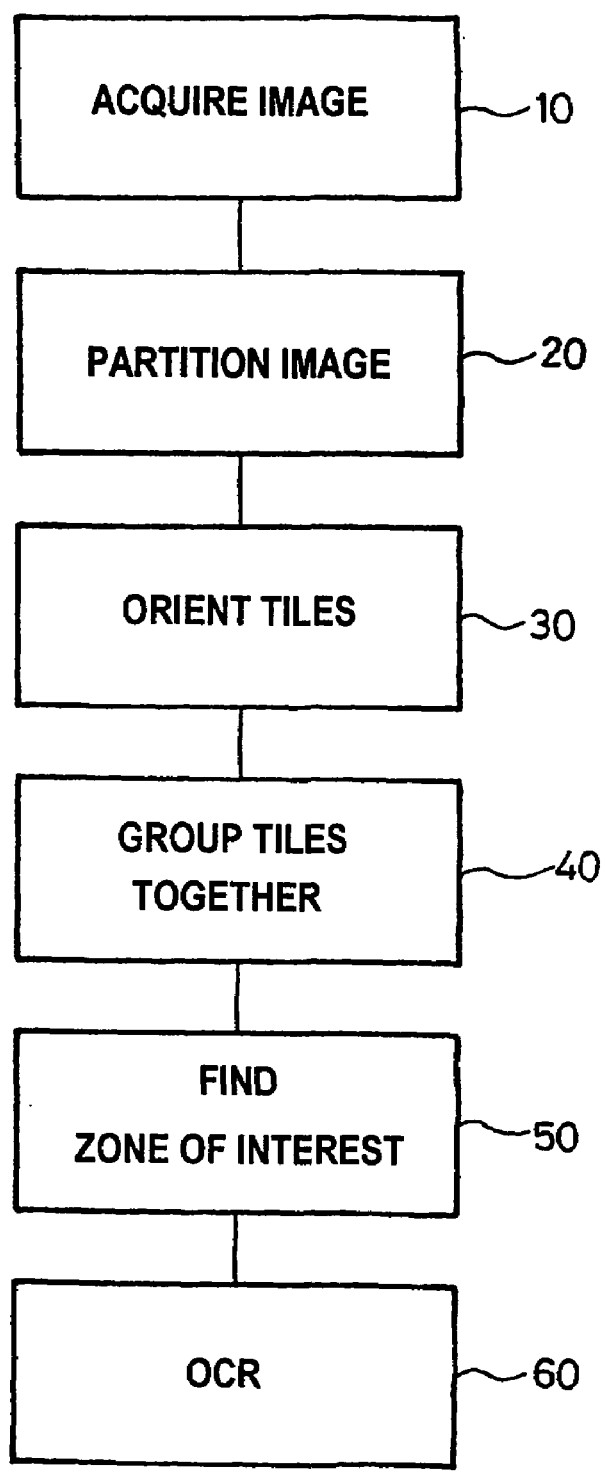

FIG_2
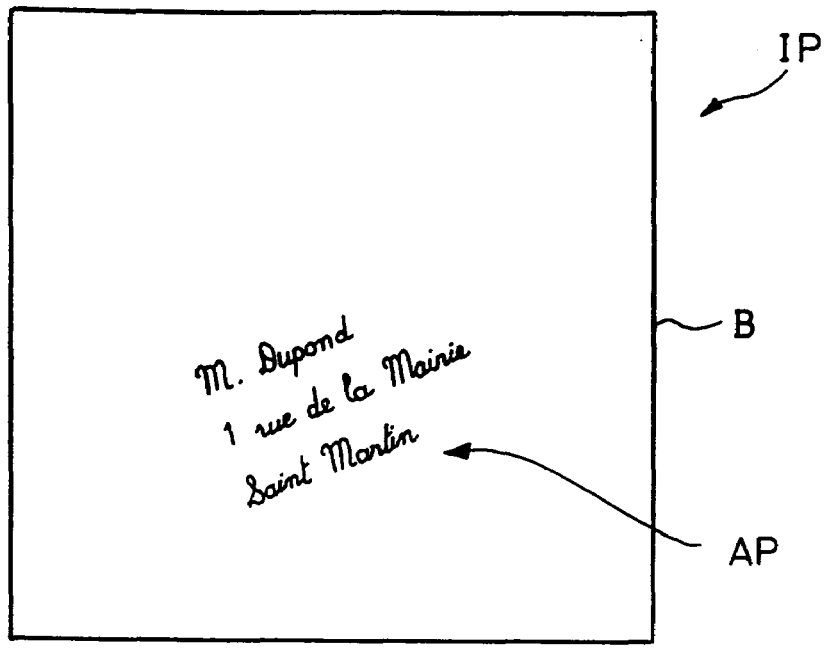
FIG_3
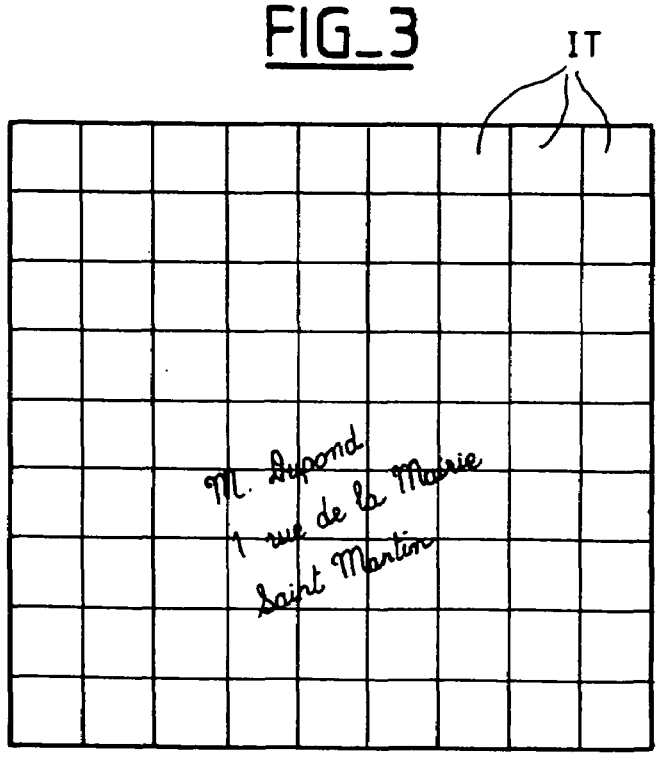

FIG_4
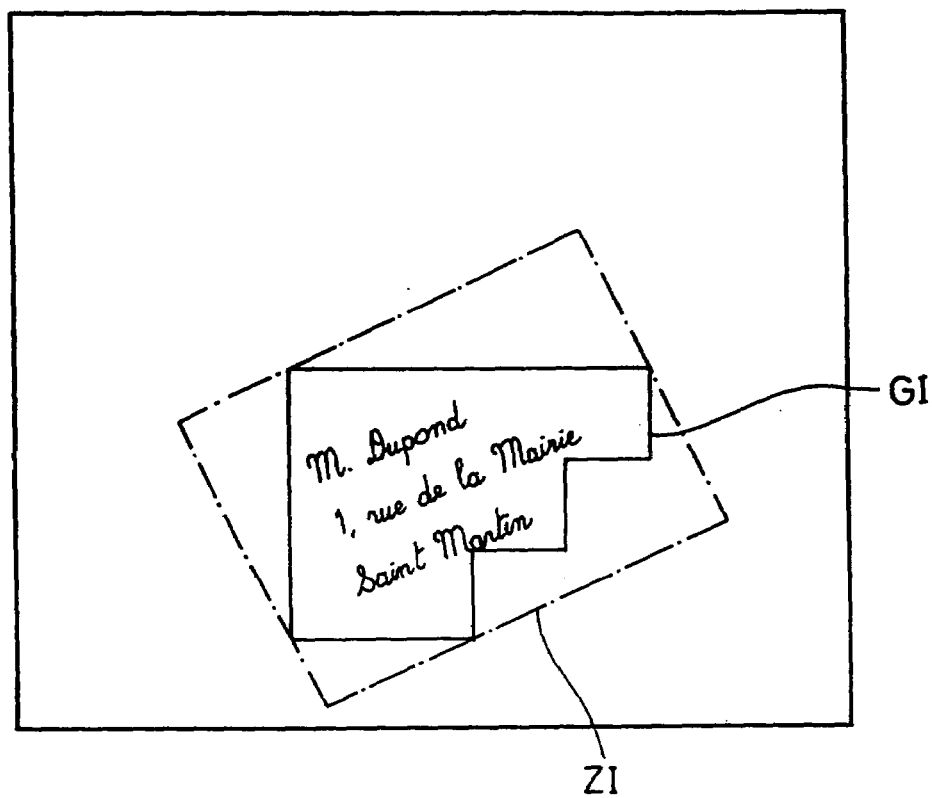
FIG_5
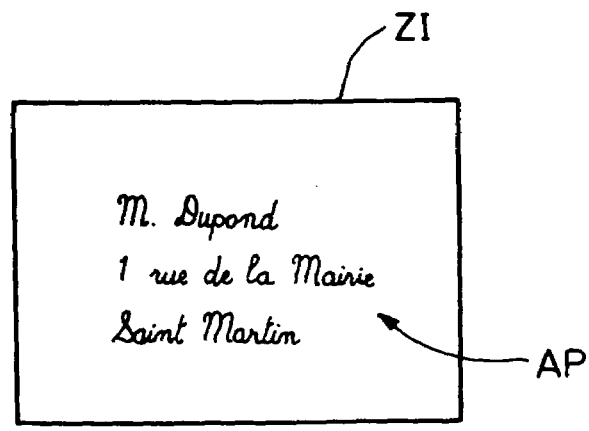

FIG_6
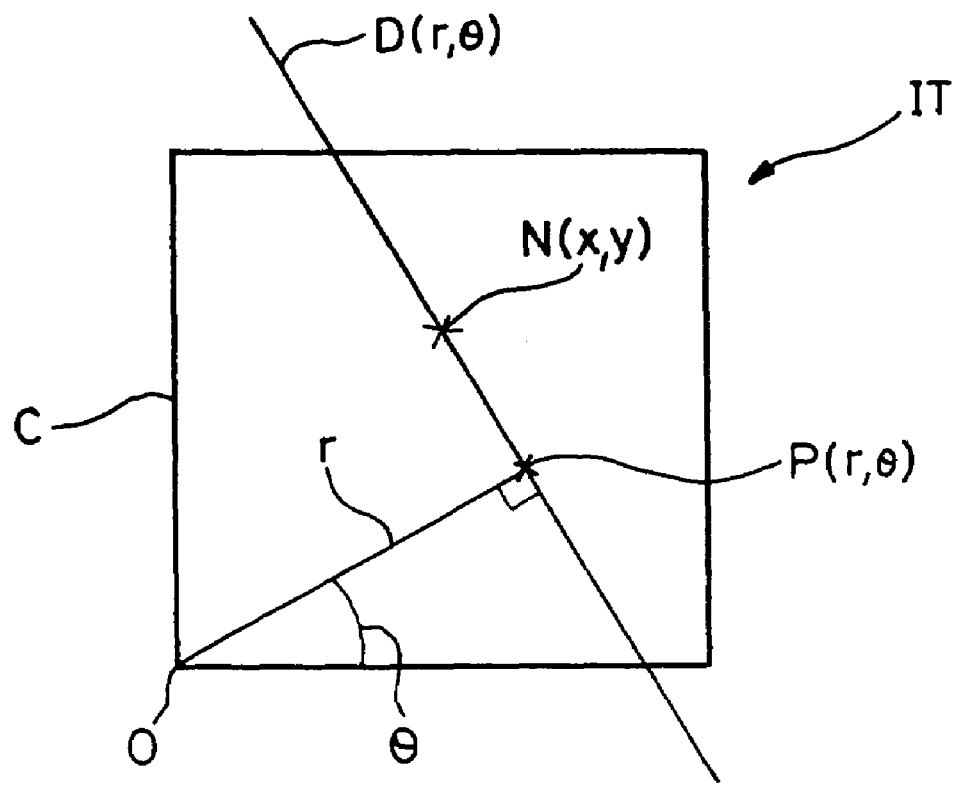

SEGMENTATION OF A POSTAL OBJECT DIGITAL IMAGE BY HOUGH TRANSFORM

The invention relates to a method of processing a digital image of a postal object in order to read a postal address automatically on said object by applying an algorithm for automatically recognizing addresses to said image.

Such a method is intended more particularly for automatically reading the postal address of postal packets in an automatic process for sorting postal packets. Addresses on postal objects of the letter type are conventionally read automatically by conveying each letter on its edge so as to cause the letter to pass in front of a camera that picks up a digital image of the letter, which image can then be binarized and filtered. In general, the lines of characters making up a postal address to be read automatically on a letter are disposed parallel to the foot of the letter or perpendicularly thereto, i.e. parallel to one of the edges of the image, such that an algorithm for automatically recognizing addresses can be applied directly to a rectangular portion of the digital image by decoding the characters in the image in the direction given by an edge of the image.

Postal objects of the packet type are generally bulky objects and they are conveyed flat on a conveyor belt. With that type of conveyor and that type of postal object, it is no longer possible to read a postal address automatically in a digital image of a packet while relying on a privileged direction for address lines being supplied by a predetermined reference in the image.

The object of the invention is to provide a solution to the problem of processing digital images of postal packets in order to be able to read automatically a postal address on each packet.

To this end, the invention provides a method of processing a digital image of a postal object in order to read automatically a postal address on said object by applying an automatic address-recognition algorithm to said image, the method being characterized in that it consists: in subdividing the image into image blocks of identical size; in applying processing based on a Hough transform to each image block in order to identify in the image block in question a privileged direction for the distribution of image points in the block under consideration; in grouping together contiguous image blocks within the image having a common privileged direction in order to define a rectangular zone of interest containing the group of said contiguous blocks having a common privileged direction in such a manner that said rectangular zone of interest has a longitudinal edge parallel to said common privileged direction; and in applying the automatic address-recognition algorithm to said zone of interest in the image in order to read a postal address automatically.

With this method, a zone of interest is obtained that is rectangular, extending longitudinally parallel to the lines of characters in a postal address, thereby making it possible following the longitudinal edge of said zone of interest to apply an automatic address-recognition algorithm to the portion of the digital image that corresponds to said zone of interest, even if the lines of the postal address in the digital image are not oriented along an edge of the digital image, as is the case for postal objects of the letter type.

An implementation of the method of the invention is described in greater detail and is shown in the accompanying drawings.

FIG. 1 is a simplified flow chart showing the steps in the method of the invention.

FIG. 2 is a diagram of a digital image of a packet, the diagram including a postal address.

FIG. 3 is a diagram of the image of the FIG. 2 packet, shown partitioned into image blocks constituting tiles.

FIG. 4 is a diagram of a group of tiles containing the postal address information on the FIG. 2 packet.

FIG. 5 is a diagram showing the zone of interest in the image of FIG. 2 as formed from the group of tiles shown in FIG. 4.

FIG. 6 shows how the Hough transform is applied to an tile.

FIG. 1 is a highly diagrammatic flow chart showing a portion of a process for sorting postal packets, the process including steps of processing digital images of packets in order to read automatically a postal address from each postal packet for use in the sorting process which consists in automatically directing the packet in question towards a corresponding sort outlet.

At 10, a packet that is being carried flat on a conveyor belt passes beneath a camera which picks up a digital image of the packet. With reference to FIG. 2 there can be seen a diagram of a digital image IP of a packet, which image includes a postal address AP, and it can be seen that in this image the lines of the postal address AP do not run parallel to an edge of the image. In general, such a digital image is subjected to operations such as binarization, eliminating isolated black pixels, . . . , such operations being for the purpose of reducing the size of the corresponding computer file and for removing interfering data that appears in the initial image and that is of no use. Thus, the image which was initially defined by pixels representing a gray scale, is reduced to points that are black or white, where each point can represent, depending on the type of processing, either a pixel, or a group of pixels, or indeed any other reducing combination of pixels in the initial image. In this way, the initial image can be reduced, for example, to a sequence of coordinates, each pair of coordinate defining a black point in the image.

In the method of the invention, in step 20, the digital image IP (after binarization and filtering) is subdivided or partitioned into identical image blocks referred to below as "tiles". With reference to FIG. 3, there can be seen the image of FIG. 2 partitioned into 72 tiles IT, each tile being square in shape.

The purpose of this partitioning step is to make it possible in a subsequent step 30 to identify a privileged direction for the distribution of black points in each tile. More particularly, the privileged direction of a tile corresponds to the direction of one or more lines of characters written in the tile, said privileged direction being identified by applying an algorithm to each tile. In order to ensure that the result of applying this algorithm is pertinent, it is important for the size of the tile to correspond approximately to the size of a word or to the size of a plurality of characters. In practice, the tiles can be squares having dimensions of 2 centimeters (cm) by 2 cm on the packet, for example. An algorithm for identifying a privileged direction in an tile is described in greater detail below. Thus, at the end of step 30, a privileged direction is known for each tile, which direction generally corresponds to the direction of lines of characters in the tile, or to a direction perpendicular thereto.

In step 40, one or more groups of tiles are built up by applying the criterion that the privileged directions of the tiles in any one group are substantially parallel or substantially perpendicular, and that the tiles are contiguous. FIG. 4 shows a group of tiles GI as identified using the method of the invention in the image IP. As can be seen, this group of tiles contains the address AP, but it is still not yet in the form of a rectangle.

In step 50, zones of interest are created associated with each group of tiles provided in step 40. For a group of tiles, the privileged direction that is commonest or in most widespread use amongst the tiles of the group is computed and this privileged direction is associated with the group of tiles, after which the smallest rectangle that contains all the tiles of the group of tiles and that has an edge parallel to the privileged direction of the group of tiles is computed so as to determine the zone of interest corresponding to the group of tiles under consideration. With reference to FIGS. 4 and 5, there can be seen the zone of interest ZI that is established from the image IP, which zone contains the destination address written in lines that are parallel to the bottom edge of the rectangle constituted by the zone of interest ZI. More particularly, FIG. 5 shows the zone of interest ZI as extracted from the digital image IP using the method of the invention in step 50.

The zone(s) of interest identified in step 50 is/are then examined in step 60 by an automatic character recognition algorithm using the privileged direction associated with each zone of interest, in order to extract the looked-for postal address of the packet.

An algorithm for detecting a privileged direction in an tile, as used in step 30, can begin by applying a polar Hough transform to the tile. The Hough transform is described in detail in the work by B. Yu and A. K. Jain "Robust on fast squew detection algorithm for generic documents", Pattern Recognition, Vol. 29, No. 10, page 1609, enables a polar table to be drawn up from an tile, said polar table using the numbers of black points contained in each of a certain number of straight lines in the tile. In such a polar table having two inputs $(r,\theta)$, each pair $(r,\theta)$ corresponds to a straight line $D(r,\theta)$, with the value in the polar table for a particular pair $(r,\theta)$ corresponding to the number of black points contained by the straight line $D(r,\theta)$. FIG. 6 shows an tile IT which is a square of side C in which it can be seen that the straight line $D(r,\theta)$ containing the black point $N(x,y)$ is the straight line which passes through the point $P(r,\theta)$ and which is perpendicular to the vector $OP(r,\theta)$ where O designates the origin of a frame of reference associated with the tile. More particularly, the vector $OP(r,\theta)$ is a vector whose modulus is r and whose polar angle is $\theta$. For a square tile of side C, having a frame of reference centered on the bottom left-hand corner of the image, the set of straight lines intercepting said square tile is included in the set of straight lines $D(r,\theta)$ satisfying $-C < r \leq C.\sqrt{2}$ and $0° \leq \theta < 180°$.

Thus, in a 2 cm by 2 cm tile as shown in FIG. 6, in which it is decided to make the data discrete in steps of 2 millimeters (mm) for the radii and in steps of 10° for the angles, it is possible to construct a polar table having 24 columns, each column corresponding to a particular value for the radius, and 18 rows, each row corresponding to a particular angle value. This table is initialized so as to have 0 for all pairs $(r,\theta)$ and is then filled in progressively, starting from each black point $N(x,y)$ in the tile, using the relationship:

(*)$r = x.\cos(\theta) + y.\sin(\theta)$

For a black point $N(x,y)$, the value taken by r when $\theta = 0°$ is computed using the relationship (*), with the value of r being rounded to within 2 mm, using the selected stepsize, so as to form a pair $(r(0°),0°)$. Then 1 is added to the cell of coordinates $(r(0°),0°)$ in the polar table of the tile. This operation is then performed for $\theta = 10°, 20°, 30°, \ldots, 170°$.

This sequence of operations should be performed for each black point in the tile so as to build up the polar table of the tile. The polar table as obtained in this way then gives for each pair $(r,\theta)$, the number of black points on the line $D(r,\theta)$, said line specifically being in the form of a strip that is 2 mm wide, given the selected stepsize for making the data discrete.

To extract the privileged direction corresponding to the tile from this polar table, the sum $s^2(\theta)$ is calculated for each angle $\theta$, i.e. the sum of the squares of the terms for an entire row in the polar table, and then the angle $\theta$ is selected having the maximum value for $s^2(\theta)$.

The angle $\alpha$ corresponding to the privileged direction of the tile is then $\alpha = \theta + 90°$. For example, one such tile is constituted by two black points which are in alignment on a straight line oriented at 120°, giving $s^2(30°) = 2^2 = 4$ and $s^2(\theta) = 1^2 + 1^2 = 2$ for $\theta \neq 30°$, consequently the privileged direction provided by applying this algorithm to said tile is $\alpha = 120°$.

As can be seen, an algorithm based on the Hough transform is effective in detecting a privileged direction for the distribution of points in an image, but it does not provide data on the location of the points in the image, so it is not sufficient for identifying zones of interest in the image of a postal packet. By partitioning the image into tiles using the method of the invention prior to applying such an algorithm to each tile, the image is analyzed in such a manner as to provide sufficient information to be able to determine zones of interest that can be used quickly by an automatic address-recognition algorithm.

The invention claimed is:

1. A method of processing a digital image (IP) of a postal object in order to read automatically a postal address (AP) on said object by applying an automatic address-recognition algorithm to said image, wherein the method comprises the steps of: subdividing (20) the image into image blocks of identical size; which size is chosen in order to have blocks containing at least a plurality of characters of a word from said postal address (IP); applying (30) processing based on a Hough transform to each image block in order to identify in the image block in question a privileged direction for the distribution image points in the block under consideration; grouping together (40) contiguous image blocks within the image having a common privileged direction in order to define (50) a rectangular zone of interest (ZI) containing the group of said contiguous blocks having a common privileged direction in such a manner that said rectangular zone of interest has a longitudinal edge parallel to said common privileged direction; and applying the automatic address-recognition algorithm to said zone of interest in the image in order to read a postal address automatically.

2. A method according to claim 1, wherein the image blocks are chosen to be squared blocks.

3. A method according to claim 2, wherein the image blocks are chosen to have dimensions of two centimeters by two centimeters on said postal object.

* * * * *